United States Patent [19]
Hildebrecht

[11] 4,245,527
[45] Jan. 20, 1981

[54] CONTROL PEDAL ASSEMBLY

[75] Inventor: Harold V. Hildebrecht, Cleveland, Ohio

[73] Assignee: Towmotor Corporation, Mentor, Ohio

[21] Appl. No.: 952,363

[22] Filed: Oct. 18, 1978

[51] Int. Cl.³ .................. B60K 41/00; G05G 1/14; G05G 9/08

[52] U.S. Cl. .................. 74/874; 74/471 R; 74/474; 74/478; 74/512; 74/875

[58] Field of Search ............ 74/471 R, 474, 478, 74/512, 513, 874, 875; 192/0.098, 3 S

[56] References Cited

U.S. PATENT DOCUMENTS

| | | | |
|---|---|---|---|
| 2,281,755 | 5/1942 | Dunning | 192/3 S |
| 2,411,463 | 11/1946 | Pozgay | 192/0.098 X |
| 2,989,875 | 6/1961 | Torrance | 74/512 X |
| 3,023,869 | 3/1962 | Morse | 74/875 X |
| 3,220,281 | 11/1965 | Irgens | 74/875 |
| 3,640,155 | 2/1972 | Waner | 74/875 |
| 3,691,863 | 9/1972 | Shaffer | 74/478 |
| 3,952,512 | 4/1976 | Feller | 74/474 X |
| 3,995,510 | 12/1976 | Yost | 74/478 X |
| 4,010,657 | 3/1977 | Amdall | 74/474 X |
| 4,026,164 | 5/1977 | Mozingo | 74/478 |
| 4,106,362 | 8/1978 | Hildebrecht | 74/474 |

Primary Examiner—Allan D. Herrmann
Attorney, Agent, or Firm—Phillips, Moore, Weissenberger, Lempio & Majestic

[57] ABSTRACT

A control pedal assembly (10) including first (16), second (18) and third (12) pedal portions, the first (16) and second (18) pedal portions each being pivotally movable relative to the third (12) pedal portion and extending in a common direction from an edge portion of the third (12) pedal portion, the third (12) pedal portion being movable relative to the first (16) and second (18) pedal portions, each one of the pedal portions being separately movable and simultaneously movable with another of the pedal portions.

14 Claims, 2 Drawing Figures

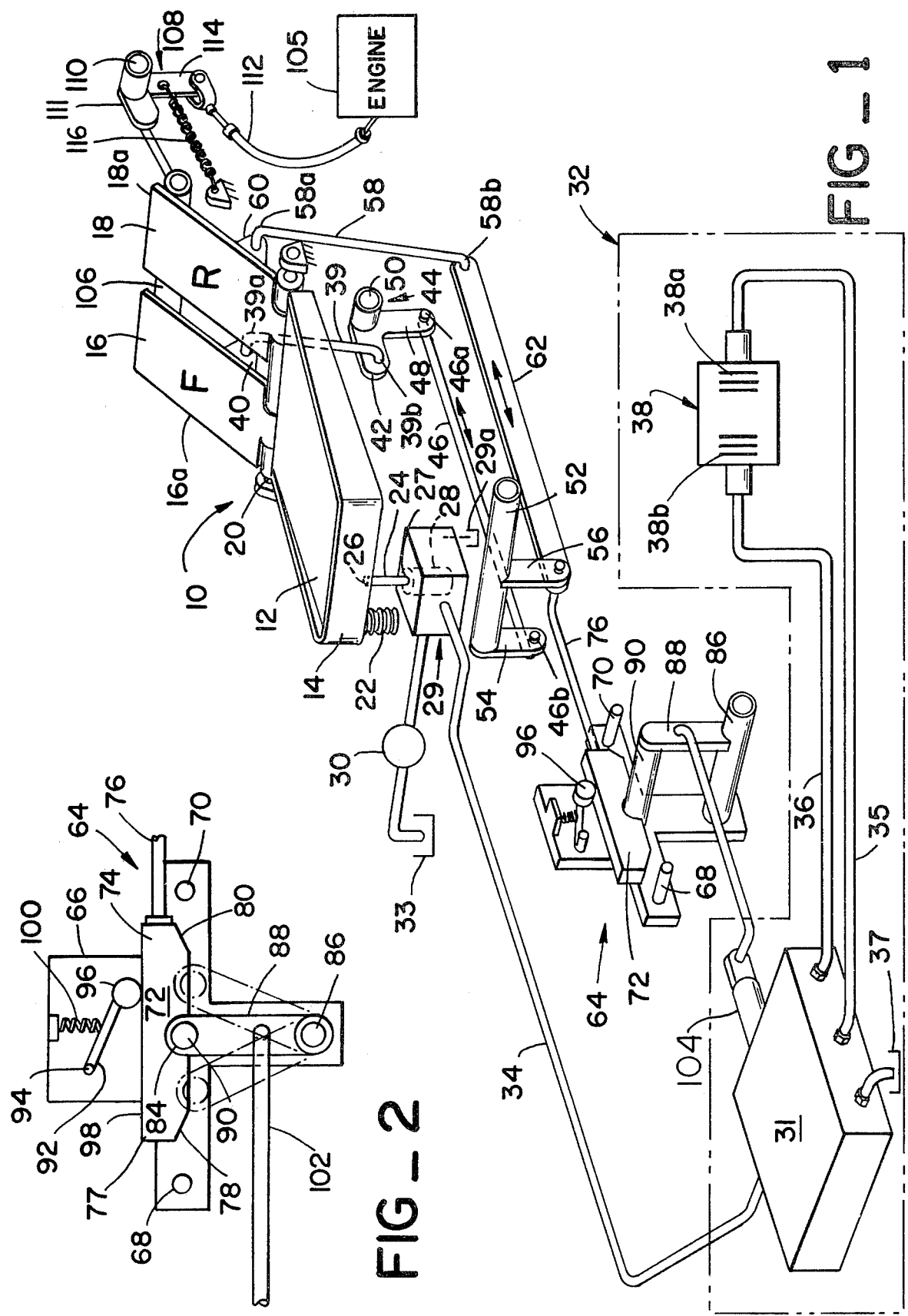

CONTROL PEDAL ASSEMBLY

TECHNICAL FIELD

This invention relates to apparatus for controlling the movement of a vehicle and, more particularly, to a control pedal assembly for controlling a plurality of vehicle movement functions.

BACKGROUND ART

Vehicles such as fork lift trucks are in wide use for handling and moving articles between various locations. In the operation of these vehicles it is often required that the vehicle be simultaneously steered and driven at various speeds, as well as having the forks actuated to pick up or deliver articles. The steering of the vehicle and the manipulation of the forks are normally controlled by the operator's hands, while the direction and speed of the vehicle are controlled by the operator's feet. Since all of these operations could occur simultaneously, various control arrangements have been developed to simplify the work required by the vehicle operator.

Typically, the prior art uses pedal arrangements that enable the operator to shift the vehicle transmission between neutral and forward or reverse drive while at the same time accelerating the vehicle engine. Additional pedal arrangements are utilized to provide inching control, known as vehicle "creep", in which the engine is run at a high speed with the transmission near its neutral position to allow, for example, slippage of transmission clutches. In one pedal arrangement, pedal members or portions are spaced closely together, in which one member controls engine speed and another the position or drive condition of the transmission. A problem exists in that to produce creep the engine speed is at a relatively high r.p.m. before starting to engage the transmission, and this could cause, for example, transmission clutches to prematurely burn up. In another pedal arrangement, the pedal members employed for producing creep are widely spaced so that the operator disadvantageously has to use both feet for this purpose, unlike the one arrangement.

Furthermore, the prior vehicles typically incorporate a "dead-man" feature which prevents the transmission of power from the engine drive shaft to an output driven shaft and, hence, vehicle movement. This "deadman" function can be obtained by automatically shifting a transmission control lever or valve from a forward or reverse drive condition to neutral when the operator leaves the vehicle. However, due to a malfunction, the lever or valve may not be returned to neutral, whereby the vehicle can still be moving even with the operator removed from the vehicle.

Also, the prior art utilizes override mechanisms which enable a pedal member to be further depressed after shifting a transmission into drive in order to increase the speed of the engine. The mechanisms typically include springs which are preloaded to permit full movement of, for example, a transmission control lever upon partial movement of the accelerator pedal member, and which are then compressed upon further movement of such a pedal member without moving the control lever. A problem with these override mechanisms is that the spring can wear or fatigue after a period of use in which they are constantly compressed and uncompressed, whereby they will need to be replaced. Another problem with such prior override mechanisms is that the force required to compress the springs is substantial, thereby requiring great effort by the operator.

DISCLOSURE OF THE INVENTION

The present invention is directed to overcoming one or more of the problems as set forth above.

In accordance with one aspect of the present invention there is provided a control pedal assembly comprising first, second and third pedal portions, the first and second pedal portions each being pivotally movable relative to the third pedal portion and extending in a common direction from an edge portion of the third pedal portion, the third pedal portion being movable relative to the first and second pedal portions, each one of the pedal portions being separately movable and simultaneously movable with another of the pedal portions.

In accordance with another aspect of the present invention there is provided, in combination, first means for moving in either of two directions, second means for moving with said first moving means over only a preselected portion of movement of said first moving means, means for coupling said first moving means to said second moving means to permit the preselected portion of movement, and means for decoupling said first moving means from said second moving means when said second moving means has moved the preselected portion to permit further relative movement between said first moving means and said second moving means.

Two problems with the prior art pedal arrangements are that the engine is run at a relatively high speed before the transmission clutches are allowed to slip and the pedal arrangements don't provide for a "dead-man" feature which positively returns the transmission to neutral. Also, the prior override mechanisms can fatigue. These problems are solved with the above-mentioned structure of the two aspects of the invention. The advantages are that the transmission clutches can begin slipping at a low engine speed and that a positive "deadman" feature can be directly tied to the pedal assembly, whereby positive control of power from the engine drive shaft to the driven shaft can be obtained. Also the fatigue and other problems with prior override mechanisms can be eliminated.

BRIEF DESCRIPTION OF THE DRAWINGS

FIG. 1 is an isometric view of a pedal and linkage arrangement of the present invention.

FIG. 2 is a side view of the transmission override mechanism used in the arrangement of FIG. 1.

BEST MODE FOR CARRYING OUT THE INVENTION

FIG. 1 illustrates a control pedal assembly 10 for controlling movement of a vehicle such as a fork-lift truck (not shown). The pedal assembly 10 includes a plate or pedal portion 12, having a wall 14 about three sides of the plate 12, for actuation by the heel portion of a vehicle operator's foot. Two additional, relatively closely spaced plates or pedal portions 16 and 18, respectively, are upwardly inclined from the plate 12 for actuation by the ball or toe portion of the operator's foot. A pivot shaft 20 is connected across adjacent ends of the plate 12 and plates 16 and 18, with the latter two plates 16, 18 extending from shaft 20 in a direction away from the direction in which plate 12 extends from shaft 20. Each plate 12, 16 and 18 is connected to shaft 20 to pivot individually about shaft 20 so that all of these plates can pivot with respect to one another.

A spring 22 biases the plate 12 towards an uppermost position so that when the operator's foot is removed from the pedal arrangement 10, the plate will be in such uppermost position. A rod 24 is connected at one end 26 to the underside of plate 12 and at its other end 27 to a spool 28 of a conventional, infinitely variable, modulation valve 29. The valve 29 is disposed in a hydraulic circuit between a pump 30 and a conventional, main transmission control valve 31 for a transmission or control system 32 such as a torque converter transmission. The pump 30 delivers hydraulic fluid from a tank 33 through a conduit 33a to the valve 29, and from valve 29 to the input of the valve 31 through a conduit 34. Valve 31 is controllable by pedal portions 16 and 18 to direct the input hydraulic fluid to either of two output lines 35 and 36 as will be described, or to a drain 37. Spring disengaged transmission clutches shown generally at 38 are engaged by the fluid pressure received from valve 31. Clutches 38a are controlled by the fluid in line 35 to shift the transmission 32 into forward drive and clutches 38b are controlled by the fluid in line 36 to shift the transmission 32 into reverse drive.

The rod 24, in response to movement of the plate 12, moves the spool 28 in the valve 29 through various positions to modulate the pressure of fluid flowing to clutches 38 through control valve 31. In the uppermost position of pedal 12, the rod 24 will place valve 29 in a shut-off position to prevent fluid from the pump 30 from flowing to the control valve 31 to engage the clutches 38a or 38b. When shut off, valve 29 will dump the fluid from pump 30 to a drain 29a similar to drain 37. In the lowermost position of pedal 12, the rod 24 will control valve 29 to transfer maximum fluid pressure through valve 31 to fully engage the clutches 38. In between these two positions, rod 24 will place valve 29 in any one of various positions to modulate the fluid pressure acting on clutches 38 so as to allow the clutches 38 to slip, this slippage being greater as the valve 29 moves closer to its position in which the fluid is dumped to drain 29a.

A link 39 is pivotally connected at one end 39a to a depending ear 40 of the plate 16 and at its other end 39b to one arm 42 of a bellcrank 44 to rotate the latter. Another link 46 is pivotally connected at one end 46a to another arm 48 of the bellcrank 44, this crank having a pivot 50. Link 46 is movable by crank 44 to and fro in the direction shown by the double headed arrow.

A pivot 52, suitably connected to a frame (not shown) of the vehicle, has two depending arms 54 and 56. The other end 46b of link 46 is pivotally connected to the arm 54, whereby movement of the link 46 will produce either a clockwise or counterclockwise rotation of the pivot 52, depending on the direction of rotation of bellcrank 44.

A link 58 is pivotally connected at one end 58a to a depending ear 60 of the plate 18 and another end 58b is pivotally connected to one end of a link 62. The other end of the link 62 is pivotally connected to the depending arm 56 of the pivot 52. The link 62 is movable to and fro in the direction shown by another double headed arrow to rotate the pivot 52 either in a clockwise or counterclockwise direction.

An override or control mechanism 64 shown in FIGS. 1 and 2 permits additional acceleration of the vehicle engine after the transmission has been shifted into forward or reverse drive upon depressing either of the plates 16 or 18. Mechanism 64 includes a t-shaped mounting bracket 66 having two cam pins 68 and 70 on either side of the bracket. A slidable bar 72 has one end 74 coupled to one end of a connecting rod 76 whose other end is pivotally connected to the depending arm 56 of the pivot 52. The slidable bar 72 has at another end 77 and its one end 74 inclined cam followers or surfaces 78 and 80 which cooperate with the cam pins 68 and 70, respectively, as will be described. The bar 72 also has a curved notch 84 between the ends 74 and 77.

A pivot pin 86 is pivotally connected to the lower end of mounting bracket 66 and a bar 88 connected to the pin 86 extends upwardly from it. A rod 90 is connected at one end to the upper end of the bar 88 and extends adjacent to the mounting bracket 66 near notch 84. A link 92 is mounted at one end to the upper end of bracket 66 by a pivot 94 and has a roller 96 at its other end which rolls on the top surface 98 of the bar 72 as the latter slides. A spring 100 is disposed between the bracket 66 and lever 92 to bias the roller 96 downwardly onto the bar 72 and maintain or couple the bar 72 on the rod 90 within the notch 84.

A connecting rod 102 is pivotally connected at one end to an intermediate portion of the bar 88 and at its other end to a valve spool 104 of valve 31. Movement of the spool 104 to a plurality of detented positions causes the valve 31 to direct fluid from line 34 to line 35 or 36 to shift the transmission 32 either into forward or reverse drive, i.e., one detented position of the spool 104 corresponds to forward drive while the other detented position corresponds to reverse drive.

To accelerate or increase the speed of a vehicle engine or control system 105, a roller 106 is supported spaced apart from and across the backside 16a and 18a of both plates 16 and 18. The roller 106 will roll along a backside when either plate is depressed to contact the roller 106. A bellcrank 108 with a pivot 110 has one arm 111 connected to the roller 106, whereby the bellcrank 108 will rotate when either plate 16 or 18 moves the roller 106. An accelerator cable 112 is pivotally connected to another arm 114 of the bellcrank 108 so that upon rotation of the bellcrank 108, the accelerator cable 112 will move a throttle (not shown) to which it is connected to accelerate or decelerate the engine 105 depending on the direction of rotation of the bellcrank. A spring 116 is connected to the bellcrank 108 to bias the cable 112 and hence the throttle to an idle condition of the engine.

Industrial Applicability

In the position shown in FIGS. 1 and 2, the pedal control assembly 10 and the accompanying linkage including the override mechanism 64 are in a neutral position. Thus, valve 29 is in its shut-off position so that the transmission clutches 38 are disengaged. Also, the throttle (not shown) to which the accelerator cable 112 is connected will be in a position corresponding to the idle condition due to the biasing of spring 116, with the roller 106 being spaced from the plates 16 and 18.

To move the vehicle forwardly at full speed, the operator can first depress the pedal portion 16 which will rotate about the pivot 20. Rod 39 will move downwardly to rotate the bellcrank 44 in a counterclockwise direction against the bias of spring 116, which will then move rod 46 to the right as viewed in FIG. 1. The pivot 52 along with its depending arms 54 and 56 will rotate in a counterclockwise direction to thereby move connecting rod 76 to the right. Since the bar 72 is biased onto pin 90 via the notch 84, as the former moves to the right with rod 76, the lever 88 will move in a clockwise direction to move connecting rod 102 to the right, as illustrated in dotted lines in FIG. 2 for the lever 88. Accordingly, the spool 104 also will be moved with the rod 102 to shift the valve 31 into a position communicating line 34 with line 35 for forward drive.

As the bar 72 moves to the right the cam surface 80 will approach the cam pin 70. When the surface 80 just contacts the cam pin 70, the valve spool 104 will be shifted into a commonly known detent in the valve 31 to lock the valve 31 into a position corresponding to forward drive.

As the pedal plate 16 is being depressed shifting the valve 31 into forward drive, the roller 106 will be contacted along the underside 16a to rotate the bellcrank 108 in a counterclockwise direction. This will move the accelerator cable 112 to increase the engine speed. With the valve 31 locked into the forward drive position by means of the detent in the valve 31, the operator may want to increase the engine speed. This is accomplished by further depressing the pedal 16 which will move the accelerator cable 112. This movement of pedal 16 can be accomplished because the bar 72, which is in contact at the cam surface 80 with cam pin 70 at the time the detent position is reached, will ride up the pin 70 against the force of spring 100. The rod 90 will be displaced from the notch 84 to enable this further rightward movement of the bar 72 even though the lever 88 cannot move further because of the detent. Accordingly, additional engine speed can be achieved when the control valve 31 is locked in a position of forward drive.

With the valve 31 in forward drive, and the vehicle engine 105 being at high speed, full vehicle speed can be obtained by fully engaging the transmission clutches 38a so as to prevent them from slipping. This is accomplished by the operator pressing down fully on the pedal plate 12 to fully open the modulating valve 29 and allow a full flow of hydraulic fluid from the pump 30 through the control valve 31 to the transmission clutches 38a. If the operator wants to move the vehicle under "creep" conditions in forward drive, he need merely then let up on the plate 12 to allow the plate to rise slightly under the force of spring 22. This will cause the valve 29 to modulate the fluid pressure on the transmission clutches 38a to allow them to slip. Thus, it will be seen that if the operator simultaneously fully depresses the pedal plate 16 while simultaneously depressing the pedal plate 12 only a small amount, the vehicle will be in forward drive with the engine being run at a high speed and with the clutches 38a being allowed to slip.

Of course, the pedal plate 12 could be operated first to supply fluid pressure to the control valve 31. Thereafter, the pedal plate 16 could be depressed to engage the clutches 38a in dependence on the modulated pressure from the valve 29. It will be noted that the spacing between the plate 16 (and 18) and the roller 106 is such that only when the valve 31 is shifted into forward (or reverse) drive is contact made by the plate 16 with the roller 106. This prevents increasing the engine speed before the shift is made.

With the vehicle in forward drive, and the engine 105 at, for example, a high speed, the vehicle transmission 32 can be placed in neutral by releasing all pressure on the pedal plate 12 to bring this plate to its uppermost position. The modulating valve 29 will then be in a shutoff position to prevent the flow of hydraulic fluid to the clutches 38a to thereby disengage the clutches. To reduce the speed of the vehicle engine 105, the operator can also release the pressure on the pedal plate 16, which will then move in a counterclockwise direction due to the bias of spring 116, enabling the bellcrank 108 to rotate in a clockwise direction and thus reduce the engine speed. At the same time, rod 39 will be moved upwardly to rotate the bellcrank 44 in a clockwise direction which will then cause pivot 52 to rotate in a clockwise direction. Accordingly, bar 72 will slide to the left via the leftward movement of the rod 76 with the cam surface 80 sliding down the cam pin 70 until the rod 90 becomes lodged within the notch 84. As already noted, at this position in which the cam surface 80 is just adjacent the pin 70 with the pin 90 in the notch 84, the valve spool 104 will still be in the detent position.

To pull the valve spool 104 out of the detent position, the operator will then depress slightly the pedal plate 18 to rotate the plate 18 about the pin 20. This rotation will cause the link 58 to move in a downward direction to move the rod 62 to the left as viewed in FIG. 1. Consequently, the pivot 52 will rotate in a clockwise direction causing the rod 76 to move the bar 72 from its position in which the surface 80 is adjacent the cam pin 70 towards the neutral position shown in the drawings. As bar 72 so moves, the rod 90 will move with it and rotate the lever 88 and pin 86 in a counterclockwise direction. Connecting rod 102 and spool 104 will therefore move to the left and the valve spool will be then pulled out of the detent position. Once out of the detent, a conventional return spring (not shown) in the valve 31 will automatically return the spool 104 to neutral, with the override mechanism 64 in the position shown in full lines in FIG. 2.

To place the vehicle in reverse drive at full speed, the operator can control the pedal 10 in a similar manner as when placing the vehicle in full speed forward drive. The pedal plate 18 will be depressed to rotate it about the pivot pin 20 in a clockwise direction. This will cause the link 58 to move in a downward direction to move rod 62 to the left. Accordingly, pivot 52 will move in a clockwise direction forcing rod 76 and bar 72 to move to the left from its neutral position shown in FIG. 2. Until the surface 78 contacts cam pin 68, the rod 90 will be engaged within notch 84 to rotate lever 88 and pivot pin 86 in a counterclockwise direction, as indicated in dotted lines in FIG. 2, and rod 102 and spool 104 to the left. Therefore, the control valve 31 will be moved to couple line 34 to line 36 to engage the clutches 38b and shift the transmission 32 into reverse drive. The valve 31 will lock in another detent when the surface 78 just contacts the cam pin 68.

As surface 78 approaches cam pin 68, the plate 18 will be rotating the bellcrank 108 in a counterclockwise direction to move the accelerator cable 112 and begin acceleration of the engine. With the surface 78 just in contact with pin 68, additional acceleration can be obtained by depressing the pedal plate 18 further, thereby forcing bar 72 further to the left and causing the pin 68 to elevate the bar 72 as the surface 78 rides up the pin 68. Consequently, rod 90 will move out of notch 84, thereby enabling continued leftward movement of the bar 72 without further rotation of the lever 88. Then, in a similar manner as described previously, the pedal plate 12 can be actuated to any position between its uppermost position and its lowermost position for enabling valve 29 to supply fluid pressure to the transmission clutches 38 to disengage the clutches, to allow the clutches to slip, or to fully engage the clutches.

Also in a similar manner, as already described, with the transmission 32 shifted into reverse drive, and the engine being accelerated, the speed of the engine can be reduced by releasing the pressure on the pedal plate 18. In addition to moving the accelerator cable 112, this will cause bar 72 to slide to the right with the cam surface 78 sliding down the rod 68 until the pin 90 becomes lodged within the notch 84. In this position, in which the cam surface 78 is just adjacent the pin 68, the spool 104 will still be in the detent position. The operator can then depress slightly the plate 16 to shift the spool 104 out of the detent. Once out of the detent, another conventional return spring (not shown) in the valve 31 will automatically return the spool 104 to a position corresponding to neutral, whereby override mechanism 64 will be in the full line position of FIG. 2.

It will thus be seen that with the present invention, the engine can be at a relatively low speed when starting to engage the clutches 38 for providing creep. This can be accomplished, for example, by simultaneously slightly depressing the pedal portions 12 and 16 to provide a low modulating pressure to the clutches 38a at a low engine speed. Furthermore, this vehicle condition of creep can be obtained by manipulating the control pedal assembly 10 with a single foot. Also, a positive "dead-man" function is obtained since even if the valve 31 is not returned to a neutral position, the valve 29 will move to its position in which fluid is dumped to the drain 29a when the operator's foot is released from the pedal portion 12.

Also, the override mechanism 64 comprises essentially rigid components such as bar 72 and rod 90 to move rod 102. Consequently, the fatigue problem associated with prior override mechanisms does not occur with mechanism 64.

Other aspects, objects and advantages of this invention can be obtained from a study of the drawings, the disclosure and the appended claims.

What is claimed is:

1. A control pedal assembly (10), comprising:
first (16), second (18) and third (12) pedal portions, each of said pedal portions (16, 18, 12) having an edge portion positioned about a common axis (20), said first (16) and second (18) pedal portions each being pivotally movable relative to said third (12) pedal portion and extending in a common direction outwardly from said edge portion of said third (12) pedal portion, said third (12) pedal portion being movable relative to said first (16) and second (18) pedal portions, each one (12, 16, 18) of said pedal portions being separately movable and simultaneously movable with another (12, 16, 18) of said pedal portions.

2. A control pedal assembly (10) according to claim 1, further including:
(a) first (106, 108,112) and second (39,44,46, 52,54,56,58,62,76) control members each being engageable with said first (16) and second (18) pedal portions, both said first and second control members being movable in response to movement of either one (16, 18) of said first (16) and second (18) pedal portions; and
(b) a third (24,29) control member being engageable with said third (12) pedal portion and movable in response to movement of said third (12) pedal portion.

3. A control pedal assembly (10) according to claim 2, further including a first control system (105), said first control member (106,108,112) controlling said first control system (105) over substantially the entire range of movement of said first control member (106,108,112).

4. A control pedal assembly (10) according to claim 2, further including:
(a) a first control system (32); and
(b) means (64) for controlling said first control system (32) in response to movement of said second control member (39,44,46,52,54,56,58,62,76) over only a preselected portion of movement of said second control member (39,44,46,52,54,56,58,62,76).

5. A control pedal assembly (10) according to claim 4 further including a second control system (105), said first control member (106,108, 112) controlling said second control system (105) over substantially the entire range of movement of said first control member (106, 108,112).

6. A control pedal assembly (10) according to claim 2 wherein said first control member (106,108,112) includes:
(a) a roller (106) being engageable across said first (16) and second (18) pedal portions; and
(b) a linkage (108,112) connected to said roller (106) and movable in response to movement of said roller (106).

7. A control pedal assembly (10) according to claim 2 wherein said second control member (39,44,46, 52,54,56,58,62,76) includes:
(a) a rotatable member (52);
(b) a first linkage (39,44,46,54) connected between said first (16) pedal portion and said rotatable member (52); and
(c) a second linkage (56,68,62) connected between said second (18) pedal portion and said rotatable member (52), said first linkage (39,44,46,54) rotating said rotatable member (52) in one direction in response to movement of said first (16) pedal portion and said second linkage (56,58,62) rotating said rotatable member (52) in another direction in response to movement of said second (18) pedal portion.

8. A control pedal assembly (10) according to claim 3 wherein said first control system (105) includes an engine, and said first control member (106,108,112) includes means (112) for regulating the speed of said engine (105).

9. A control pedal assembly (10) according to claim 4 wherein said first control system (32) includes a control valve (31) having a fluid input (34), a plurality (35,36) of fluid outputs, and means (104) for selectively directing fluid at said input (34) to one (35,36) of said outputs.

10. A control pedal assembly (10) according to claim 2 wherein said third control member (24,29) includes a control valve (29) and a movable control rod (24) controlling said valve (29) over substantially the entire range of movement of said rod (24).

11. A control pedal assembly (10) according to claim 10 wherein said control valve (29) is a fluid control valve having means (28) for modulating the pressure of fluid passing through said valve (29).

12. A control system for controlling an engine (105) and a transmission (32), comprising:
(a) a pedal assembly (10) having first (16), second (18) and third (12) pedal portions, each one of said pedal portions (16, 18, 12) having an edge portion positioned about a common axis (20), said first (16) and second (18) pedal portions each being pivotally movable relative to said third (12) pedal portion and extending in a common direction outwardly from said edge portion of said third (12) pedal portion, said third (12) pedal portion being movable relative to said first (16) and second (18) pedal portions, each one (12, 16, 18) of said pedal portions being separately movable and simultaneously movable with another (12, 16, 18) of said pedal portions;

(b) first control means (106, 108, 112) for controlling the speed of the engine (105) in response to movement of either one (16, 18) of said first (16) and second (18) pedal portions and being engageable with said first (16) and second (18) pedal portions;

(c) second control means (39, 44, 46, 52, 54, 56, 58, 62, 76) for controlling the transmission (32) for forward or reverse drive in response to movement of said first (16) pedal portion or said second (18) pedal portion and being engaged with said first (16) pedal portion and said second (18) pedal portion; and (d) third control means (24, 29) for modulating the transmission (32) in response to movement of said third (12) pedal portion between one position and another position and for neutralizing the transmission (32) in response to said third (12) pedal portion being at said one position, said third (12) pedal portion being biased to said one position and said third control means (24, 29) being engageable with said third (12) pedal portion.

13. A control mechanism (64), comprising:
(a) first means (72) for moving in either of two directions and having first (74) and second (77) sides;
(b) second means (86, 88, 90) for moving with said first moving means (72) over only a preselected portion of movement of said first moving means (72);
(c) means (92, 94, 96, 100) for releasably coupling said first moving means (72) to said second moving means (86, 88, 90); and
(d) means (68, 70, 78, 80) for lifting said first moving means (72) from said second moving means (86, 88, 90) in response to movement of said second moving means (86, 88, 90) over the preselected portion for permitting further relative movement between said first moving means (72) and said second moving means (86, 88, 90), including first (70) and second (68) spaced-apart cams, said first moving means (72) being movable between said cams (68, 70), and first (80) and second (78) cam surfaces at said first (74) and second (77) sides, respectively, and being in contact with said first (70) and second (68) cams, respectively, in response to movement of said second moving means (86, 88, 90) over the preselected portion.

14. A control mechanism (64), comprising:
(a) first means (72) for moving in either of two directions, including a first bar (72) having a notch (84);
(b) second means (86, 88, 90) for moving with said first moving means (72) over only a preselected portion of movement of said first moving means (72), including a second bar (88) spaced from said first bar (84) and a pin (90) extending from said second bar (88) into said notch (84);
(c) means (92, 94, 96, 100) for releasably coupling said first moving means (72) to said second moving means (86, 88, 90); and
(d) means (68, 70, 78, 80) for decoupling said first moving means (72) from said second moving means (86, 88, 90) in response to movement of said second moving means (86, 88, 90) over the preselected portion for permitting further relative movement between said first moving means (72) and said second moving means (86, 88, 90).

* * * * *